United States Patent
Chieng et al.

(10) Patent No.: US 8,219,226 B2
(45) Date of Patent: Jul. 10, 2012

(54) SYSTEMS AND METHODS FOR OVERRIDING HARDWIRED RESPONSES IN AN HDA CODEC

(75) Inventors: Daniel L. Chieng, Austin, TX (US); Douglas D. Gephardt, Dripping Springs, TX (US); Jeffrey M. Klaas, Lakeway, TX (US)

(73) Assignee: D2Audio Corporation, Milpitas, CA (US)

( * ) Notice: Subject to any disclaimer, the term of this patent is extended or adjusted under 35 U.S.C. 154(b) by 982 days.

(21) Appl. No.: 12/202,358

(22) Filed: Sep. 1, 2008

(65) Prior Publication Data

US 2009/0063738 A1  Mar. 5, 2009

Related U.S. Application Data

(60) Provisional application No. 60/969,610, filed on Sep. 1, 2007, provisional application No. 60/969,612, filed on Sep. 1, 2007.

(51) Int. Cl.
  *G06F 17/00* (2006.01)
  *G06F 13/00* (2006.01)
  *G06F 9/30* (2006.01)
  *G06F 9/40* (2006.01)

(52) U.S. Cl. ............. 700/94; 710/65; 712/209; 712/213

(58) Field of Classification Search ............. 381/104, 381/119, 120; 700/94; 710/65, 69; 712/35, 712/36, 208, 209, 213
See application file for complete search history.

(56) References Cited

U.S. PATENT DOCUMENTS

| | | | |
|---|---|---|---|
| 6,012,142 A | 1/2000 | Dokic | |
| 6,016,075 A | 1/2000 | Hamo | |
| 6,205,223 B1 | 3/2001 | Rao | |
| 6,279,045 B1 | 8/2001 | Muthujumaraswathy et al. | |
| 6,301,366 B1 * | 10/2001 | Malcolm et al. | 381/119 |
| 6,427,181 B1 | 7/2002 | Furuhashi | |
| 6,748,515 B1 | 6/2004 | Hendrickson | |

(Continued)

FOREIGN PATENT DOCUMENTS

EP  1 677 574 A  7/2006

OTHER PUBLICATIONS

"4-Channel DAC and 6-Channel ADC High Definition Audio Codec, ALC262 Series Datasheet (Rev. 1.7)," Realtek Semiconductor Corp., Mar. 22, 2007, pp. i-64, http://www.realtek.cz/download/datasheets/alc262_v1.7.pdf.

(Continued)

*Primary Examiner* — Jesse Elbin
(74) *Attorney, Agent, or Firm* — Fliesler Meyer LLP

(57) ABSTRACT

Systems and methods for overriding hardwired responses of a codec to High Definition Audio (HDA) verbs that are received from an HDA controller. In one embodiment, an HDA codec is configured to store one or more overriding responses, each of which is associated with a corresponding HDA verb. When an HDA verb is received by the codec, the codec determines whether the verb is associated with one of the overriding responses. If the verb is associated with one of the overriding responses, the overriding response is returned to the HDA controller. If the first HDA verb is not associated with one of the stored overriding responses, provide a hardwired response associated with the first HDA verb to the HDA bus. Overriding responses can be returned for unsupported verbs only, or for any verbs that prompt responses.

26 Claims, 3 Drawing Sheets

U.S. PATENT DOCUMENTS

| | | | |
|---|---|---|---|
| 6,920,553 | B1 | 7/2005 | Poisner |
| 7,425,992 | B2 | 9/2008 | Feeler et al. |
| 7,640,041 | B2 | 12/2009 | Ragan |
| 2002/0119803 | A1 | 8/2002 | Bitterlich |
| 2005/0160195 | A1 | 7/2005 | Bruner et al. |
| 2006/0247811 | A1 | 11/2006 | Zaucha |
| 2007/0005160 | A1 | 1/2007 | Zaucha |
| 2007/0067506 | A1 | 3/2007 | Cho |
| 2007/0239438 | A1 | 10/2007 | Chuang |
| 2008/0287063 | A1* | 11/2008 | Kidron et al. ............. 455/41.2 |
| 2009/0060228 | A1 | 3/2009 | Chieng et al. |

OTHER PUBLICATIONS

"High Definition Audio Specification, Revision 1.0," Intel Corporation, Apr. 15, 2004, http://download.intel.com/standards/hdaudio/pdf/HDAudio_03.pdf, pp. i-173.

"Low Power, Stereo CODEC w/Headphone & Speaker Amps," Cirrus Logic, Dec. 1, 2006, pp. 1-82, http://www.digchip.com/datasheets/download_datasheet.php?id=1104824&part-number=CS42L52.

"Overview of Audio Codec '97, revision 1.0," Intel Corporation, http://euc.jp/periphs/AC97_OVR.PDF, pp. 1-4, 1996.

International Search Report and Written Opinion dated Jan. 30, 2009 for Application No. PCT/US2008/074964, 13 pages.

International Search Report dated Nov. 25, 2008 for Application No. PCT/US2008/074963.

International Search Report and Written Opinion dated Jan. 30, 2009 for Application No. PCT/US2008/074966, 14 pages.

International Search Report dated Nov. 27, 2008 for Application No. PCT/US2008/074965.

International Search Report and Written Opinion dated Jan. 30, 2009 for Application No. PCT/US2008/074967, 14 pages.

Kennedy, R., et al., "Tailor configurable processors for audio codecs," Electronic Engineering Times-Asia, Aug. 16, 2006, pp. 1-3.

Maxim Integrated Products, "Innovative Audio Cost-Reduction and Space-Saving Solutions Tune out the Competition," 2006, pp. 1-23, XP002503538; http://newsletter.spezial.de/pdfdata/AUDIO_9.pdf> [retrieved on Nov. 11, 2008].

Princeton Technology Corp., "Stereo 2W Class-D Amplifier With Built-In Audio Processor," Jul. 2008, pp. 1-4, XP002503539; http://www.princeton.com/tw/> [retrieved on Nov. 11, 2008].

* cited by examiner

SYSTEMS AND METHODS FOR OVERRIDING HARDWIRED RESPONSES IN AN HDA CODEC

CROSS-REFERENCE TO RELATED APPLICATIONS

This application claims the benefit of U.S. Provisional Patent Application 60/969,610, filed Sep. 1, 2007, and U.S. Provisional Patent Application 60/969,612, filed Sep. 1, 2007, both of which are hereby incorporated by reference as if set forth herein in their entirety.

BRIEF DESCRIPTION OF THE DRAWINGS

Other objects and advantages of the invention may become apparent upon reading the following detailed description and upon reference to the accompanying drawings.

Figure 1:
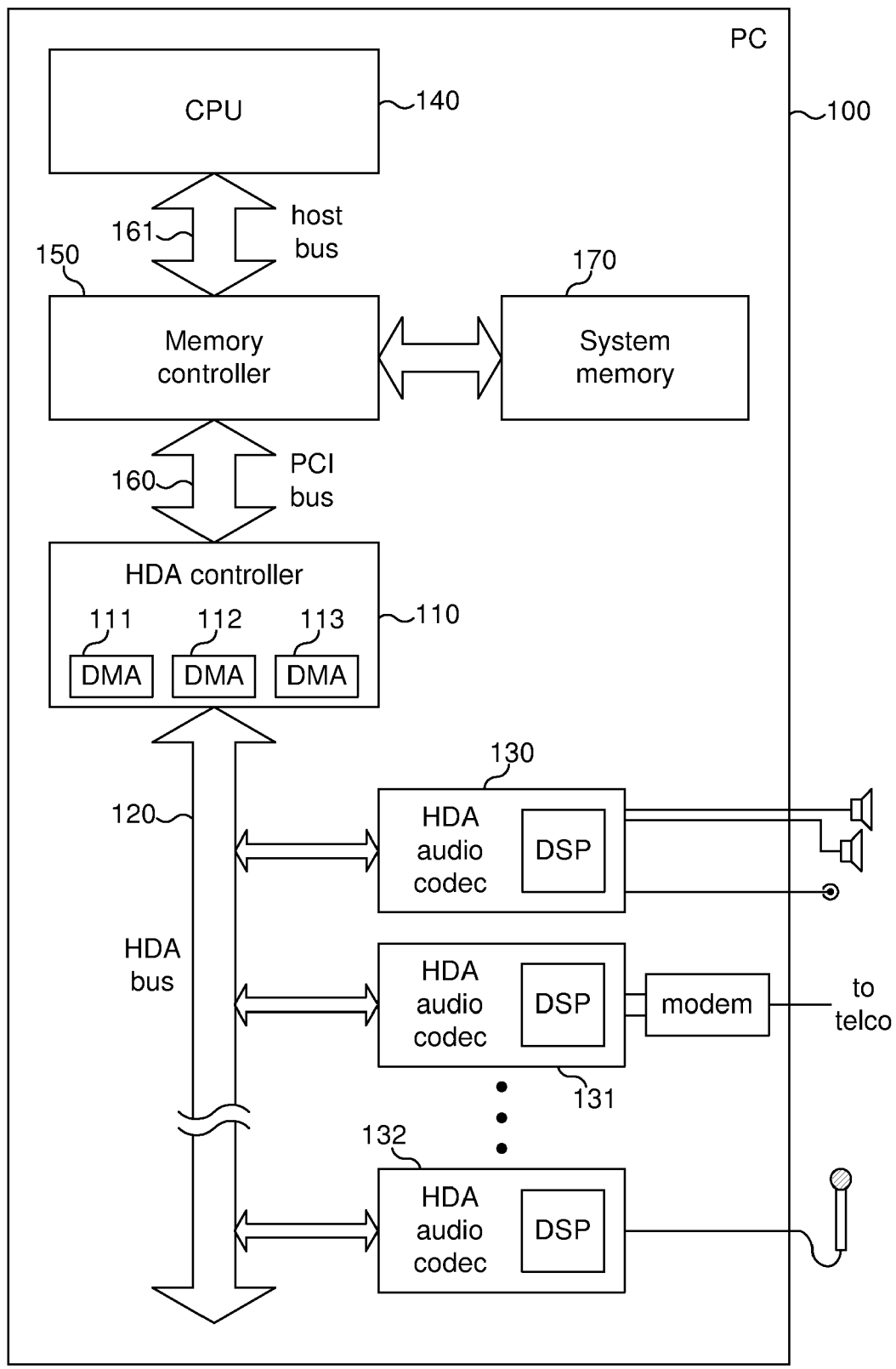
FIG. 1 is a functional block diagram illustrating the hardware structure of a system having a High Definition Audio (HDA) architecture that incorporates a processor-based codec in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF THE EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods implemented in a personal computer (PC) having a High Definition Audio (HDA) system. The present systems and methods provide a mechanism for overriding hardwired responses to HDA verbs that are received from the HDA controller. A processor-based codec is configured to receive HDA verbs and to identify ones of the verbs for which an overriding response is stored. If there is an overriding response for a received verb, the overriding response is returned to the HDA controller in place of a hardwired response. If no overriding response is provided for the received verb, the hardwired response is returned to the HDA controller.

In one embodiment, the HDA codec is configured to identify HDA verbs that prompt responses and to generate an interrupt in response to receiving a verb that might be overridden. This might include only unsupported verbs (those for which the hardwired response is a null response) or it might include all verbs that prompt a response (so that affirmative hardwired responses can be overridden). The interrupt prompts the processor in the codec to determine whether an overriding response has been provided for the verb that triggered the interrupt. If there is an overriding response, it is returned. Otherwise, the hardwired response is returned. Alternative embodiments may include PC systems that incorporate this codec, as well as methods for using the system.

The present systems and methods can therefore modify the function of the codec, not only by allowing the processor of the codec to be reprogrammed, but also by masking the operation of the hardwired portions of the codec (i.e., by replacing one or more of the hardwired responses that would normally be provided with programmable responses).

PC-Based Audio

Before describing exemplary embodiments of the invention, it will be helpful to review some relevant background information. With the proliferation of PCs and advances in computer technologies, there has been a demand for PCs that have an increasing number of advanced features. Customers that purchase multimedia PCs and high-end gaming PCs in particular are demanding premium audio quality in order to achieve the ultimate audio/visual experience from their PCs. This demand has been addressed to some extent by the High Definition Audio specification introduced by Intel.

When Intel's 1997 Audio Codec standard (AC'97) was introduced, PC users typically listened to music and movies that only had stereo sound. As multi-channel audio formats such as Dolby Digital and DTS became more popular, users became accustomed to these audio formats and began to expect full surround, multi-speaker sound using these formats to be available in a PC environment. While AC'97 technology was initially adequate, it has not been able to keep pace with more recent advancements (e.g., newer audio and video encoding/decoding algorithms) that enable the PC to produce higher-quality audio.

Beginning with the introduction of Intel's High Definition Audio Specification Rev 1.0 in 2004, which is incorporated herein by reference, the HDA interface has been gradually gaining popularity in the PC space. The HDA architecture defined by the Intel specification attempts to meet the need for high quality audio in the PC space. This architecture defines the delivery of high fidelity audio content from a PC's memory to one or more audio codecs using an HDA controller that performs direct memory access (DMA) transfers of audio data over an HDA bus. The audio data delivered over the HDA bus is received, processed and output by the various components of the codecs (referred to in the HDA specification as "widgets").

While the HDA specification allows quite a bit of flexibility in the design of an HDA system for a PC, this flexibility is lost when the design is implemented. For instance, while an HDA system may have multiple codecs that perform different types of processing on audio data, these codecs are hardwired and their functionality and responses to HDA commands cannot be changed. It would be desirable to provide systems and methods that maintain the flexibility of the HDA system, including enabling changes to the functionality and responses of the codec after the system is implemented.

This flexibility is provided in one system by providing an HDA codec that incorporates a programmable processor. The use of a processor in the codec allows the operation of the codec to be modified. Not only can the programming of the processor be changed to modify its functions, but some functions of the hardwired portions of the codec can be overridden by the processor. This makes the hardwired portions of the codec appear to the HDA controller as if they had been modified.

In particular, the present systems and methods provide a mechanism for overriding hardwired responses to HDA verbs that are received from the HDA controller. The codec accomplishes this by generating an interrupt when an HDA verb is received by the codec. The verb is decoded from data on the HDA bus and the DSP determines whether the hardwired response to the verb should be overridden by a programmed response. If a programmed response (also referred to as an override response) is provided, the codec returns this response to the HDA controller instead of the hardwired response. If no programmed response has been provided for the received verb, the hardwired response is returned to the HDA controller. The hardwired response may be either an affirmative response or a null response.

High Definition Audio (HDA)

Intel's High Definition Audio Specification was introduced to address the demand for high quality audio in the PC space. Users of multimedia PCs and high-end gaming PCs in particular are demanding premium audio quality in order to achieve the ultimate audio/visual experience from their PCs. The HDA architecture bridges the gap in delivering high fidelity audio content from the memory system of the PC to the audio codecs of the HDA system.

The primary goal of the HDA specification is to describe an infrastructure within a PC environment which is designed to support high quality audio. This infrastructure provides a mechanism for transferring audio data directly from the PC's memory system to one or more audio codecs via an HDA bus. The codecs typically convert the digital audio data received from the memory to analog signals and process these signals to output signals that can be provided as, for instance, a line output, a modem output, or an output to an amplifier.

Referring to FIG. 1, a functional block diagram illustrating the hardware structure of a system having an HDA architecture that incorporates a processor-based codec is shown. As depicted in this figure, the HDA architecture in a PC 100 includes an HDA controller 110, an HDA bus 120 and several codecs (e.g., 130-132). HDA controller 110 is coupled to the PC's memory controller 150, along with CPU 140. While FIG. 1 shows only three codecs, there may be more or fewer codecs in a given embodiment.

HDA controller 110 is coupled to memory controller 150 via a bus (160) such as a PCI bus or other type of system bus. Memory controller 150 is coupled to CPU 140 by a host bus 161. Memory controller 150 is also coupled to the system memory 170. Codec 131 may be connected to one or more converters in order to convert the audio data processed by the codec to a suitable output format, or to convert input data received by the codec to an appropriate format for use by the codec. The audio processing of the codec is performed by a group of interconnected HDA widgets. The output signals produced by the converters may be provided to a variety of output devices such as amplifiers, speakers or headphones.

HDA controller 110 acts as a bus mastering input/output (I/O) device on the PCI bus. HDA controller 110 includes multiple DMA engines 111-113 that control the transfer of data between system memory 170 (via memory controller 150 and bus 160) and the various HDA codecs. The DMA engines can transfer data from the codecs to the system memory, as well as transferring data from the system memory to the codecs. HDA bus 120 is configured to support serial data transfers between HDA controller 110 and the codecs. HDA bus 120 is also used to distribute a 24 MHz bit line clock from the HDA controller to the codecs. This bit line clock is used by the controller and the codecs to enable the transfer of data over the HDA bus. The codecs use the bit line clock to extract time-multiplexed, serialized data from the HDA bus.

Figure 2:
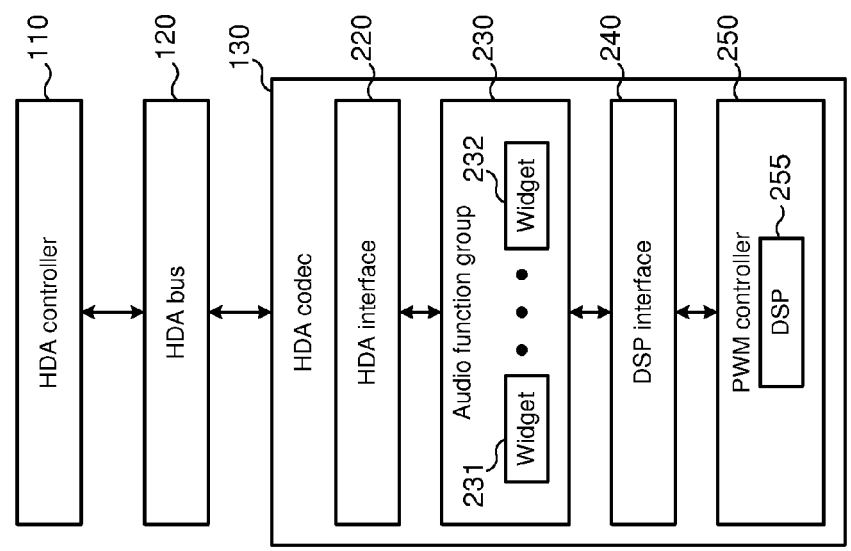
FIG. 2 is a functional block diagram illustrating the structure of an HDA codec in accordance with one embodiment.

Referring to FIG. 2, a functional block diagram illustrating the HDA codec in more detail is shown. FIG. 2 depicts HDA controller 110 coupled to HDA bus 120. HDA codec 130 is also coupled to HDA bus 120. HDA controller 110 communicates with codec 130 by transmitting frames of data over HDA bus 120. This data includes both control data and audio data.

Codec 130 includes an HDA interface 220, an audio function group 230, a DSP interface 240, and a Class-D PWM controller 250 that is based on DSP 255.

When HDA controller 110 conveys data on the HDA bus, HDA interface 220 reads the data off the HDA bus and forwards the data to the appropriate nodes in audio function group 230. Audio function group 230 includes various components 231-232 (referred to in the HDA specification as "widgets"), each of which is addressable as a node in the audio function group. The identifiers (Node IDs) for some nodes may be mapped to DSP 255, which is configured to perform many of the functions that are performed by particular widgets in conventional HDA codecs. PWM controller 250 can provide PWM output signals via the output lines of the codec.

The codec may contain a variety of widgets or modules that perform specific functions within a function group. These widgets may perform various functions such as mixing audio signals, controlling volume, controlling codec input and output, etc. Conventionally, all of the widgets in the codec are hardwired and perform fixed functions. Similarly, when a conventional codec is queried by the HDA controller (when the controller sends the codec a command that requires the codec to respond), the widgets return a fixed, hardwired response. In the present systems, because the DSP of the codec allows it to be updated, a response other than the hardwired response may be more appropriate. The present systems therefore allow the usual hardwired responses to be overridden. For instance, if the codec does not initially support a feature, the most appropriate response to an inquiry about this feature might be a null response (no response at all). If the DSP is modified to provide the queried feature, an affirmative response about the feature is more appropriate. The DSP can therefore override the null response and provide an affirmative response regarding the feature. In the same manner, if the hardwired response is an affirmative response and the feature is changed or even eliminated, a different response (possibly a null response) may be more appropriate, so the DSP can override the original hardwired response with the new response. In one embodiment, the codec achieves this result using a structure as shown in FIG. 3.

Figure 3:
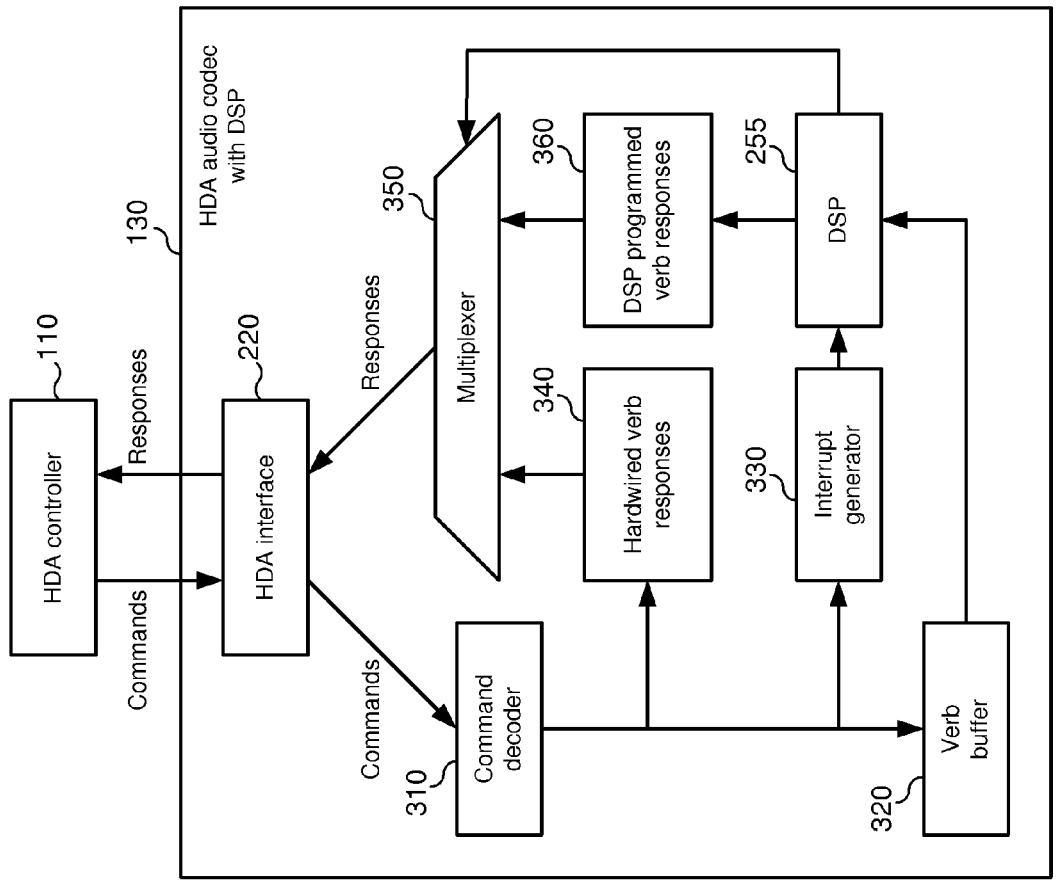
FIG. 3 is a functional block diagram illustrating a mechanism for overriding responses to HDA verbs in accordance with one embodiment.

FIG. 3 is a functional block diagram illustrating the mechanism by which the codec identifies verbs for which a response to an HDA verb should be overridden and then returns the new response to the HDA controller. As noted above, HDA controller 110 conveys commands to HDA codec 130 via the HDA bus. The commands are retrieved from the frames of data on the HDA bus by HDA interface 220. The commands are forwarded from HDA interface 220 to command decoder 310, which decodes the commands to identify the corresponding HDA verbs. The verbs are forwarded to verb buffer 320, interrupt generator 330 and memory 340. Verb buffer 320 temporarily stores the verbs for use by DSP 255. Interrupt generator 330 examines the verbs and determines whether or not it is necessary to generate an interrupt in response to each of the received verbs. In some embodiments, an interrupt will be generated for every verb that is received and that prompts a response. (The codec may receive some verbs that do not prompt a response, in which case neither a hardwired response nor a programmed response is returned.) In other embodiments, interrupts may be generated only for a subset of the verbs, such as those which are unsupported by an affirmative hardwired response.

Memory 340 uses the verbs received from command decoder 310 to identify the corresponding hardwired responses. Memory 340 may, for example, be a look-up table that contains a response to a corresponding to each verb. The responses may either be affirmative responses such as component identifiers, status indicators, etc., or they may be null responses (i.e., no response at all). Conventionally, if the response is affirmative, the corresponding response will be conveyed to the HDA controller in an inbound frame on the HDA bus. If the response is null, the codec will simply not respond to the command. In the present systems, rather than sending this response directly to HDA interface 220, the response is provided to multiplexer 350, which may select this hardwired response or a programmed response to forward to the HDA interface.

When interrupt generator 330 generates an interrupt, the interrupt is forwarded to DSP 255. Upon receiving this interrupt and the corresponding verb (from verb buffer 320), DSP 255 determines whether memory 360 contains a programmed response that is associated with the verb. Memory 360 may be a lookup table in which each entry contains a verb and an associated response. If DSP 255 determines that there is a programmed response associated with the received verb in memory 360, the programmed response is forwarded to multiplexer 350, and the DSP controls the multiplexer to select this programmed response to be forwarded to HDA interface 220. If memory 360 does not contain a programmed response associated with the received verb, no response is forwarded from memory 360 to multiplexer 350, and DSP 255 controls the multiplexer to select the hardwired response from memory 340 to be forwarded to HDA interface 220. Whichever response is forwarded from multiplexer 350 to HDA interface 220 is returned to the HDA controller. (It should be noted that "returning" a null response means not responding at all.)

It should be noted that memory 340 may be replaced in some embodiments by a logic circuit or some other type of component that can produce a response corresponding to a received verb. Memory 360 may also be replaced by other means to produce a programmed response corresponding to a received verb. Also, memories 340 and 360 need not incorporate look-up tables, but may instead use another memory configuration.

Figure 4:
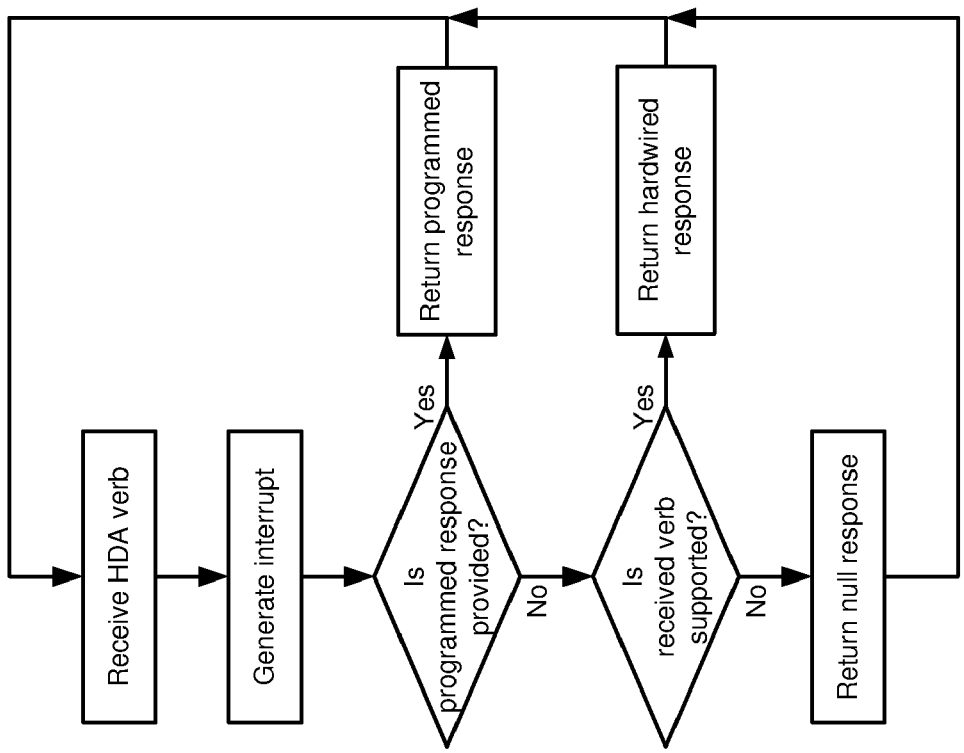
FIG. 4 is a flow diagram illustrating the operation of an embodiment of the present system in which all hardwired verb responses can be overridden.

The operation of the system of FIG. 3 is described below with reference to FIGS. 4 and 5. FIG. 4 is a flow diagram illustrating an embodiment in which all hardwired verb responses can be overridden, while FIG. 5 illustrates an embodiment in which programmed responses are only provided when the received verb is unsupported (i.e., the hardwired response is a null response).

FIG. 4 is a flow diagram illustrating the operation of an embodiment of the system of FIG. 3 in which all hardwired verb responses can be overridden. In this embodiment, whenever an HDA verb is received, an interrupt is generated. In response to the interrupt, the DSP determines whether a programmed response has been provided to override the hardwired response. If there is a programmed response, this response is returned to the HDA controller. This response may be an affirmative response or a null response. If the DSP determines that no programmed response has been provided, the system responds conventionally. That is, the system determines whether there is a hardwired response and returns the hardwired response if it is available. Otherwise, a null response is returned.

Figure 5:
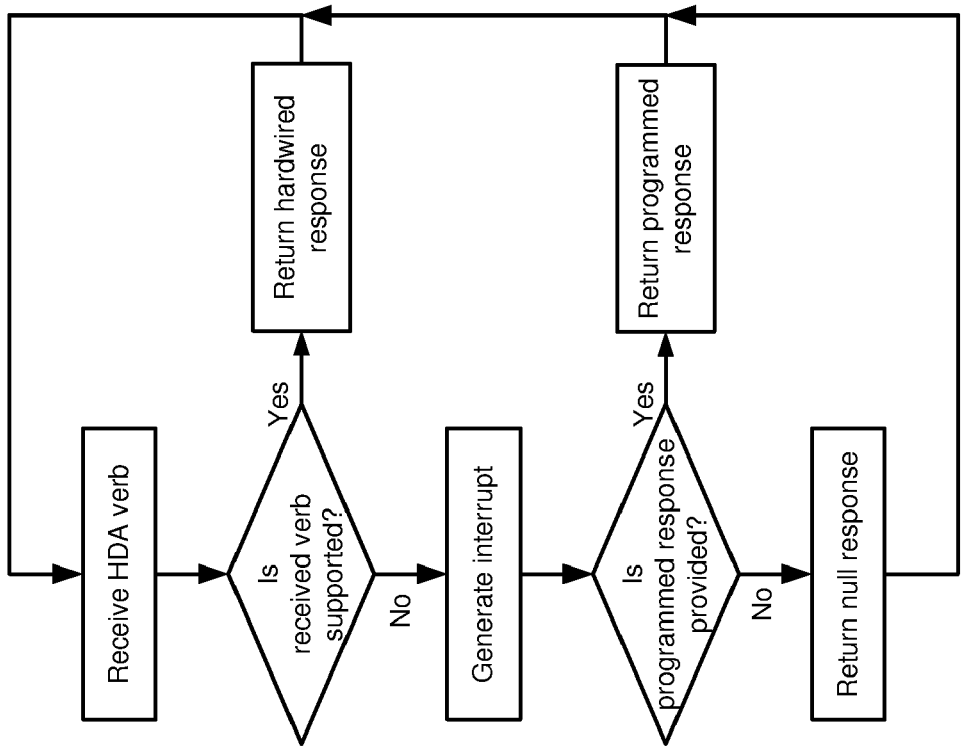
FIG. 5 is a flow diagram illustrating the operation of an embodiment of the present system in which only unsupported verb responses are overridden.

FIG. 5 is a flow diagram illustrating the operation of an embodiment of the system of FIG. 3 in which programmed responses are provided in with respect to unsupported verbs (i.e., verbs for which the hardwired response is null). In this embodiment, when an HDA verb is received, the system first determines whether the verb is supported. If the verb is supported, the hardwired response to the verb is returned to the HDA controller. If it is determined that the verb is unsupported, then an interrupt is generated. In response to the interrupt, the DSP determines whether a programmed response has been provided. If there is a programmed response, this response is returned to the HDA controller instead of the hardwired null response. This response will typically be an affirmative response. If the DSP determines that no programmed response has been provided, the null response will be returned.

It should be noted that the terms "PC" and "personal computer" are used herein to refer to a wide range of computing systems that are commonly purchased and used by individual consumers. These systems may include desktop computers, laptop computers, tablet computers and the like, and may be used in home, office, mobile or other environments. It should also be noted that, although the embodiments described above focus on codecs that incorporate DSP's, other embodiments may use types of processors other than DSP's (such as general purpose programmable processors, programmable microcontrollers, etc.) to achieve the programmability, configurability and other advantages that are obtained through the use of a processor in the HDA codec.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:
1. A device comprising:
a codec configured to be coupled to a High Definition Audio (HDA) bus;
wherein the codec includes
a memory configured to store one or more overriding responses, each of which is associated with a corresponding HDA verb;
an HDA interface configured to receive a first HDA verb from the HDA bus;

a programmable processor configured to determine whether the first HDA verb is associated with one of the overriding responses stored in the memory;

wherein if the programmable processor determines that the first HDA verb is associated with one of the overriding responses stored in the memory, then the programmable processor causes the associated one of the stored overriding responses to be provided to the HDA bus; and wherein if the programmable processor determines that the first HDA verb is not associated with one of the overriding responses stored in memory, then a hardwired response associated with the first HDA verb is provided to the HDA bus.

2. The device of claim 1, wherein the codec is configured to generate an interrupt associated with receipt of the first HDA verb, and wherein the programmable processor of the codec is configured to determine whether the first HDA verb is associated with one of the overriding responses stored in the memory in response to the interrupt.

3. The device of claim 2, wherein the codec is configured to generate the interrupt only when the first HDA verb is an unsupported HDA verb.

4. The device of claim 2, wherein the codec is configured to generate the interrupt for every HDA verb received by the codec that prompts a response.

5. The device of claim 1, wherein the hardwired response associated with the first HDA verb is a null response.

6. The device of claim 1, wherein the hardwired response associated with the first HDA verb comprises one of an affirmative response and a null response.

7. The device of claim 1, wherein:
the one or more overriding responses are stored in a look-up-table in the memory; and
the programmable processor is configured to look up the first HDA verb in the look-up-table to determine whether there is an entry for the first HDA verb in the look-up-table.

8. A codec comprising:
an HDA interface configured to couple the codec to an HDA bus;
a command decoder coupled to the HDA interface and configured to decode a first HDA verb received by the decoder from the HDA bus;
an interrupt generator configured to generate an interrupt in response to the first HDA verb;
a first memory configured to store one or more hardwired responses, each of which is associated with a corresponding HDA verb;
a second memory configured to store the one or more overriding responses, each of which is associated with a corresponding HDA verb;
a multiplexer configured to select, as an output to the HDA interface, one of a hardwired response associated with the first HDA verb from the first memory and an overriding response associated with the first HDA verb from the second memory; and
a processor configured to receive the interrupt and the first HDA verb, to determine whether the first HDA verb is associated with one of the stored overriding responses, and to control the multiplexer to select either the hardwired response associated with the first HDA verb or the overriding response associated with the first HDA verb.

9. The device of claim 8, wherein the second memory comprises a look-up-table, and wherein the processor is configured to look up the first HDA verb in the look-up-table to determine whether an associated overriding response is stored in the look-up-table.

10. The device of claim 8, wherein the processor comprises a programmable processor configured to execute modifiable program instructions.

11. The codec of claim 8, wherein the identified hardwired response associated the HDA verb comprises one of an affirmative response and a null response.

12. A method implemented in a High Definition Audio (HDA) codec, the method comprising:
storing one or more override responses in memory, wherein each of the one or more override responses is associated with a corresponding HDA verb;
receiving an HDA verb that is associated with a hardwired response;
determining whether an override response associated with the received HDA verb is stored in the memory;
if an override response associated with the received HDA verb is stored in the memory, then returning the override response to the received HDA verb that is stored in the memory; and
otherwise, if an override response associated with the received HDA verb is not stored in the memory, then returning the hardwired response to the received HDA verb.

13. The method of claim 12, further comprising generating an interrupt associated with receipt of the HDA verb, and wherein the codec is configured to proceed with determining whether an override response associated with the received HDA verb is stored in the memory in response to the interrupt.

14. The method of claim 13, wherein the interrupt is generated only when the HDA verb is unsupported by an affirmative hardwired response.

15. The method of claim 13, wherein the interrupt is generated for every HDA verb received by the codec that prompts a response.

16. The method of claim 12, wherein the hardwired response associated with the first HDA verb is a null response.

17. The method of claim 12, wherein:
the storing comprises storing the one or more override responses in a look-up-table in the memory; and
the determining comprises looking up the received HDA verb in the look-up-table to determine whether there is an entry for the received HDA verb in the look-up-table.

18. A method implemented in an HDA codec, the method comprising:
retrieving and decoding an HDA verb from time-multiplexed data;
identifying a hardwired response associated the HDA verb;
identifying an override response associated the HDA verb;
controlling a multiplexer to select either the identified hardwired response or the identified override response; and
returning the selected one of the identified hardwired response and the identified override response.

19. The method of claim 18, wherein identifying an override response comprises looking up the HDA verb in a look-up-table and identifying an override response associated with the HDA verb in the look-up-table.

20. The method of claim 19, wherein the look-up-table is contained in a programmable memory in the codec, the method further comprising storing one or more HDA verbs and associated override responses in the programmable memory.

21. The method of claim 18, wherein the identified hardwired response associated the HDA verb comprises one of an affirmative response and a null response.

22. A system comprising:
   a High Definition Audio (HDA) controller;
   an HDA bus coupled to the HDA controller; and
   an HDA codec configured to be coupled to the HDA bus;
   wherein the HDA controller is configured to convey HDA verbs to the HDA codec via the HDA bus; and
   wherein the HDA codec includes
      a memory configured to store one or more overriding responses, each of which is associated with a corresponding HDA verb; and
      a programmable processor configured to determine, for each HDA verb received from the HDA controller, whether the received HDA verb is associated with one of the overriding responses stored in the memory;
   wherein if the programmable processor determines that the received HDA verb is associated with one of the overriding responses stored in the memory, then the programmable processor causes the associated one of the stored overriding responses to be provided to the HDA bus; and
   where if the programmable processor determines that the received HDA verb is not associated with one of the overriding responses stored in the memory, then a hardwired response associated with the received HDA verb is provided to the HDA bus.

23. The system of claim 22, wherein the codec is configured to generate an interrupt associated with the received HDA verb, and wherein the programmable processor of the codec is configured to determine whether the first HDA verb is associated with one of the overriding responses stored in the memory in response to the interrupt.

24. The system of claim 23, wherein the codec is configured to generate the interrupt only when the received HDA verb is an unsupported HDA verb.

25. The system of claim 23, wherein the codec is configured to generate the interrupt for every HDA verb received by the codec that prompts a response.

26. The system of claim 22, wherein:
   the one or more overriding responses are stored in a look-up-table in the memory of the codec; and
   the programmable processor of the codec is configured to look up the received HDA verb in the look-up-table to determine whether there is an entry for the received HDA verb in the look-up-table.

* * * * *